(12) United States Patent
Peng

(10) Patent No.: US 6,954,754 B2
(45) Date of Patent: Oct. 11, 2005

(54) APPARATUS AND METHODS FOR MANAGING CACHES ON A MOBILE DEVICE

(75) Inventor: Luosheng Peng, San Jose, CA (US)

(73) Assignee: InnoPath Software, Inc., Alviso, CA (US)

( * ) Notice: Subject to any disclaimer, the term of this patent is extended or adjusted under 35 U.S.C. 154(b) by 375 days.

(21) Appl. No.: 09/836,972

(22) Filed: Apr. 16, 2001

(65) Prior Publication Data

US 2002/0152229 A1 Oct. 17, 2002

(51) Int. Cl.$^7$ .............................................. G06F 17/30
(52) U.S. Cl. ......................................... 707/10; 709/201
(58) Field of Search .................. 707/201, 10; 709/217, 709/201

(56) References Cited

U.S. PATENT DOCUMENTS

| | | | | |
|---|---|---|---|---|
| 5,568,181 A | * | 10/1996 | Greenwood et al. | 725/92 |
| 5,694,546 A | * | 12/1997 | Reisman | 705/26 |
| 5,742,905 A | * | 4/1998 | Pepe et al. | 455/461 |
| 5,878,434 A | * | 3/1999 | Draper et al. | 707/202 |
| 5,991,771 A | * | 11/1999 | Falls et al. | 707/202 |
| 6,021,433 A | * | 2/2000 | Payne et al. | 709/219 |
| 6,173,311 B1 | * | 1/2001 | Hassett et al. | 709/202 |
| 6,279,041 B1 | * | 8/2001 | Baber et al. | 709/232 |
| 6,421,781 B1 | * | 7/2002 | Fox et al. | 713/201 |
| 6,505,200 B1 | * | 1/2003 | Ims et al. | 707/8 |
| 2001/0044751 A1 | * | 11/2001 | Pugliese et al. | 705/26 |
| 2002/0078209 A1 | * | 6/2002 | Peng | 709/227 |
| 2002/0091907 A1 | * | 7/2002 | Pouliot et al. | 712/1 |
| 2002/0095399 A1 | * | 7/2002 | Devine et al. | 707/1 |
| 2002/0123957 A1 | * | 9/2002 | Notarius et al. | 705/37 |
| 2002/0129024 A1 | * | 9/2002 | Lee | 707/10 |

OTHER PUBLICATIONS

U.S. Appl. No. 09/841,777, Peng, Off. Action Jul. 17, 2003.
U.S. Appl. No. 09/841,777, Peng, Off. Action Jan. 15, 2004.
U.S. Appl. No. 09/841,777, Peng, Off. Action Jun. 2, 2004.
U.S. Appl. No. 09/840,739, filed Apr. 23, 2001, Peng, "Apparatus and Methods For Managing Caches on a Gateway".
U.S. Appl. No. 09/840,736, filed Apr. 23, 2001, Peng, "Apparatus and Method For Intelligently Caching Applications and Data on a Mobile Device".
U.S. Appl. No. 09/841,777, filed Apr. 24, 2001, Peng, "Apparatus and Method For Intelligently Caching Applications and Data on a Gateway".

* cited by examiner

Primary Examiner—Wayne Amsbury
(74) Attorney, Agent, or Firm—PatentEsque Law Group, LLP; Roxana H. Yang

(57) ABSTRACT

An exemplary method for managing a cache on a mobile device comprises the steps of receiving a call for loading a set of files, the set of files including an application or data, searching a database in a database for a matching record to the set of files, determining if the set of files is out-of-date or if a scheduled update is overdue based on the matching record, updating the set of files if it is out-of-date, performing a status check or update if the scheduled update is overdue, and loading the set of files if it is not out-of-date and the scheduled update is not overdue.

24 Claims, 15 Drawing Sheets

Application Identification Table

| Column | Data Type | Length | Description |
|---|---|---|---|
| appURL | String of unicode characters | Variable length | Application URL, comprising protocol name, host address, path, and application name. Example: http://www.mysite.com/asp/myapp. |
| appID | Unsigned integer | 4 bytes | Unique identifier for the corresponding application URL. |

FIG. 4

Data Identification Table

| Column | Data Type | Length | Description |
|---|---|---|---|
| dataURL | String of unicode characters | Variable length | Data URL, comprising protocol name, host address, path, and data file name or a database query. Example: http://www.mysite.com/data/mydata. |
| dataID | Unsigned integer | 4 bytes | Unique identifier for the corresponding data URL. |

FIG. 5

Compression Methods Table

| Column | Data Type | Length | Description |
|---|---|---|---|
| compName | String | Variable length | Data compression method name. |
| compID | Unsigned integer | 1 byte | Unique identifier for the corresponding data compression method ID. |

FIG. 6

Application Download Table

| Column | Data Type | Length | Description |
|---|---|---|---|
| appID | Unsigned integer | 4 bytes | Application identifier. |
| appSize | Unsigned integer | 4 bytes | Size in byte of the corresponding application. |
| nDownload | Unsigned integer | 4 bytes | Number of downloads of the corresponding application by the mobile device. |
| timeStamp | Unsigned integer | 4 bytes | The time stamp of the last download of the corresponding application by the mobile device, based on the corresponding mobile device's local clock. |

FIG. 7

Data Download Table

| Column | Data Type | Length | Description |
|---|---|---|---|
| dataID | Unsigned integer | 4 bytes | Data identifier. |
| dataSize | Unsigned integer | 4 bytes | Size in byte of corresponding data. |
| nDownload | Unsigned integer | 4 bytes | Number of data downloads of the corresponding data by the mobile device. |
| timeStamp | Unsigned integer | 4 bytes | The time stamp of the last download of the corresponding data by the mobile device, based on the corresponding mobile device's local clock. |

FIG. 8

Application Storage Table

| Column | Data Type | Length | Description |
|---|---|---|---|
| appID | Unsigned integer | 2 bytes | Application identifier associated with the corresponding application URL. |
| nFile | unsigned integer | 1 byte | Number of files included in the corresponding application. |
| fNames | Array of strings of unicode characters | Variable length | Array of the names of all files included in the corresponding application. |
| appVer | Byte array | 16 bytes | Version information of the corresponding execution of the application. |
| fVers | Array of byte array | Variable length | Array of the version information of all files included in the corresponding application. |
| root | String of unicode characters | Variable length | Root directory in the local storage where the corresponding application is cached. |
| nextRel | Unsigned interger | 4 bytes | Next release time of the corresponding application, based on the corresponding origin application server's local clock. |
| lang | Unsigned integer | 1 byte | Code, indicating the type of computer language used to write the corresponding application. |
| flagSet | Unsigned integer | 1 byte | Flag:<br>• The $1^{st}$ bit to $7^{th}$ bit are reserved;<br>• If the $8^{th}$ bit is on, the corresponding application is out-of-date. |
| nUpdate | Unsigned integer | 2 byte | Number of updates on the corresponding application by the corresponding mobile device since the application has been cached. |
| updateRate | Unsigned integer | 1 byte | Average update rate (1-100 in percentage) for the nUpdate updates on the corresponding application by the corresponding mobile device. |
| CBI | Unsigned integer | 4 bytes | Cache Benefit Index. |

FIG. 9

Data Storage Table

| Column | Data Type | Length | Description |
|---|---|---|---|
| dataID | Unsigned integer | 2 bytes | Data Identifier of the corresponding data URL. |
| root | String of unicode characters | Variable length | Root directory in the local storage where the corresponding data is stored. |
| flagSet | Unsigned integer | 1 byte | Flag:<br>• If the $1^{st}$ bit is on, the corresponding application is updated by at least one mobile device.<br>• The $2^{nd}$ bit to $7^{th}$ bit are reserved;<br>• If the $8^{th}$ bit is on, the corresponding application is out-of-date. |
| dataVer | Byte array | 16 bytes | Version information of the corresponding execution of the data. |
| nUpdate | Unsigned integer | 2 byte | Number of updates on the corresponding data. |
| updateRt | Unsigned integer | 1 byte | Average update rate (1-100 in percentage) for the *nUpdate* updates on the corresponding data. |
| CBI | unsigned integer | 4 bytes | Cache Benefit Index. |

FIG. 10

Application Execution Table

| Column | Data Type | Length | Description |
|---|---|---|---|
| appID | Unsigned integer | 2 bytes | Unique identifier for the corresponding application URL. |
| appVer | Byte array | 16 bytes | Version information of the corresponding execution of the application. |
| timeStamp | Unsigned integer | 4 bytes | Time stamp of the corresponding execution of the application, based on the mobile terminal's local clock. |
| peCBI | Unsigned integer | 4 bytes | Per-execution Cache Benefit Index, i.e., the number of bytes saved from wireless communications by caching the application. It is 0 if the application was not cached before the corresponding execution; it is the application size in byte if the application was cached and up-to-date before the corresponding execution; it is the application size in byte, subtracted by the size in byte of the updated part otherwise. |

FIG. 11

Data Access Table

| Column | Data Type | Length | Description |
|---|---|---|---|
| dataID | Unsigned integer | 2 bytes | Data Identifier of the corresponding data URL. |
| dataVer | Byte array | 16 bytes | Version information of the corresponding execution of the data. |
| timeStamp | Unsigned integer | 4 bytes | Time stamp of the corresponding access to the data, based on the mobile terminal's local clock. |
| paCBI | Unsigned integer | 4 bytes | Per-access Cache Benefit Index, i.e., the number of bytes saved from wireless communications by caching the data. It is 0 if the data was not cached before the corresponding access; it is the data size in byte if the data was cached and up-to-date before the corresponding access; it is the data size in byte, subtracted by the size in byte of the updated part otherwise. |

FIG. 12

Application cache change table

| Column | Data Type | Length | Description |
|---|---|---|---|
| appID | Unsigned integer | 2 bytes | Application identifier associated with the corresponding application URL. |
| flagSet | Unsigned integer | 1 byte | Flag:<br>• If the 1$^{st}$ bit is on, the application is added to the application caching storage on the mobile device;<br>• If the 2$^{nd}$ bit is on, the application is removed from the application caching storage on the mobile device;<br>• The 3$^{rd}$ bit to 8$^{th}$ bit are reserved. |

FIG. 13

Data cache change table

| Column | Data Type | Length | Description |
|---|---|---|---|
| dataID | Unsigned integer | 2 bytes | Data identifier associated with the corresponding data URL. |
| flagSet | Unsigned integer | 1 byte | Flag:<br>• If the 1$^{st}$ bit is on, the data is added to the data caching storage on the mobile device;<br>• If the 2$^{nd}$ bit is on, the data is removed from the data caching storage on the mobile device;<br>• The 3$^{rd}$ bit to 8$^{th}$ bit are reserved. |

FIG. 14

Configuration Table

| Column | Data Type | Length | Description |
|---|---|---|---|
| Name | String of Unicode characters | Variable length | Parameter name. One of the following names is permitted:<br>MAX_CACHE_SIZE: *The maximum memory size in byte for the intelligent caching.*<br>FREE_MEM_SIZE: *The memory size in byte that is free for caching. It is MAX_CACHE_SIZE initially.*<br>SRCH_RSLT_SIZE: *The maximum number of search result to be received from a gateway at a time. 0 means no limitation for the size.*<br>EFFECT_PERIOD: *The amount of time application and data records can be stored in the micro DB since the last execution of or access on the corresponding applications or data.*<br>*APP_CACHE_ROOT: The top-level directory where applications can be cached.*<br>*DATA_CACHE_ROOT: The top-level directory where data can be cached.*<br>*NETWORK_TYPE: The wireless network type, either packet-switched network or circuit-switched network.*<br>*SESSION_TTL: The time-to-live of a newly created logical session, during which, the session may be reused.*<br>LAST_APP_ID: *The last assigned application identifier. It will be 0 initially.*<br>LAST_DATA_ID: *The last assigned data identifier. It will be 0 initially.*<br>LAST_APP_KEY_ID: *The last assigned application-key pair identifier. It will be 0 initially.*<br>LAST_UPLOAD_TM: *The time stamp for the last successful piggyback of the user operation histories.*<br>MAX_QUIET_TM: *The maximum amount of time allowed between two user operation histories upload operations. The user operation histories will be uploaded automatically after the amount of time even the user does not create any request to a gateway.*<br>COMM_TIMEOUT: *The timeout time for a communication message.*<br>COMM_RETRY_NO: *The permitted number of retries for a communication failure.* |
| Value | String of unicode characters | Variable length | Parameter value. It needs to be reinterpreted for different parameter names. |

FIG. 15

APPARATUS AND METHODS FOR MANAGING CACHES ON A MOBILE DEVICE

FIELD OF THE INVENTION

This invention relates to apparatus and methods for managing caches. In particular, this invention relates to apparatus and methods for managing caches on a mobile device.

BACKGROUND OF THE INVENTION

Generally, wireless/mobile devices include a user interface, such as a micro-browser, pre-installed on a wireless/mobile device and a set of fixed applications and hierarchical menus for Internet access. Using the micro-browser, a user browses the Internet using the fixed menus or by manually entering specific uniform resource locators (URLs).

Most wireless/mobile devices have inadequate processing capability for retrieving information, such as applications or data, and very limited memory space for caching such information. Thus, downloading applications or data from the Internet onto a mobile device may be very slow and sometimes unsuccessful. One possible solution to circumvent the need to repeatedly download from the Internet is to cache applications and data on the mobile device. Because mobile devices have very limited memory space, an intelligent caching of the most likely to be called applications or data is necessary to optimize this solution. Moreover, due to size and other limitations in mobile devices, efficient management of the cache space is necessary to ensure that application and data stored in the cache are up-to-date and useful to users.

Thus, it is desirable to provide apparatus and methods for managing caches on a mobile device.

SUMMARY OF THE INVENTION

An exemplary method for managing a cache on a mobile device comprises the steps of receiving a call for loading a set of files ("the original set of files"), the original set of files including an application or data, searching a database for a matching record to the original set of files, determining if the original set of files is out-of-date or if a scheduled update is overdue based on the matching record, updating the original set of files if it is out-of-date, performing a status check or update if the scheduled update is overdue, and loading the original set of files if it is not out-of-date and the scheduled update is not overdue. In one embodiment, the exemplary method further comprises the step of loading an updated set of files after an update or status check is complete.

In an exemplary embodiment, updating the original set of files includes the steps of opening a communications session with a gateway or a remote server, sending an update request to the gateway or the remote server, receiving an update response, the response including at least one difference file for updating the original set of files, closing the communications session, and updating a local file system and the database based on the update response.

In one embodiment, the local file system and the database are updated by loading the at least one difference file into a random access memory, loading a copy of the original set of files from the local file system into the random access memory, applying the at least one difference file on the original set of files in the random access memory to obtain an updated set of files, copying the updated set of files into the local file system, removing the original set of files from the local file system, updating the database based on the updated set of files, and removing the at least one difference file and the original set of files from the random access memory.

In another embodiment, the step of applying the at least one difference file to the original set of files in the random access memory includes the steps of parsing the at least one difference file to determine whether to add, modify, or delete a file in the original set of files and updating the local file system and the database based on the parsing.

In another exemplary embodiment, the exemplary method further comprises the steps of parsing the update response for a broadcast message, accessing and updating the database based on the broadcast message, sending a broadcast response to the gateway or the remote server. In one embodiment, the accessing and updating steps include the step of selectively marking at least one set of files as out-of-date.

In yet another exemplary embodiment, the step of performing a status check or update includes the steps of opening a communications session with a gateway or a remote server, sending a status check or update request to the gateway or the remote server, receiving a status check or update response from the gateway or the remote server, closing the communications session, and updating a local file system and a database if at least one difference file is included in the status check or update response.

In one embodiment, the local file system and the database are updated by loading the at least one difference file into a random access memory, loading a copy of the original set of files from the local file system into the random access memory, applying the at least one difference file on the original set of files in the random access memory to obtain an updated set of files, copying the updated set of files into the local file system, removing the original set of files from the local files system, updating the database based on the updated set of files, and removing the at least one difference file and the original set of files from the random access memory. In another embodiment, the step of applying the at least one difference file on the original set of files in the random access memory includes the steps of parsing the at least one difference file to determine whether to add, modify, or delete a file in the original set of files and updating the local file system and the database based on the parsing.

In yet another embodiment, the step of performing a status check or update further comprises the steps of parsing the status check or update response for a broadcast message, selectively marking at least one set of files as out-of-date based on the broadcast message, and sending a broadcast response to the gateway or the remote server.

An exemplary computer program product for managing a cache on a mobile device comprises logic code for receiving a call for loading a set of files ("the original set of files"), the original set of files including an application or data, logic code for searching a database for a matching record to the original set of files, logic code for determining if the original set of files is out-of-date or if a scheduled update is overdue based on the matching record, logic code for updating the original set of files if it is out-of-date, logic code for performing a status check or update if the scheduled update is overdue, and logic code for loading the original set of files if it is not out-of-date and the scheduled update is not overdue. In one embodiment, the exemplary computer program product further comprises logic code for loading an updated set of files after an update or status check is complete.

In an exemplary embodiment, the logic code for updating the original set of files includes logic code for opening a communications session with a gateway or a remote server, logic code for sending an update request to the gateway or the remote server, logic code for receiving an update response, the response including at least one difference file for updating the original set of files, logic code for closing the communications session, and logic code for updating a local file system and the database based on the update response.

In one embodiment, the logic code for updating a local file system and the database includes logic code for loading the at least one difference file into a random access memory, logic code for loading a copy of the original set of files into the random access memory, logic code for applying the at least one difference file on the original set of files in the random access memory to obtain an updated set of files, logic code for copying the updated set of files into the local file system, logic code for removing the original set of files from the local file system, logic code for updating the database based on the updated set of files, and logic code for removing the at least one difference file and the original set of files from the random access memory. In another embodiment, the logic code for applying the at least one difference file to the original set of files in the random access memory includes logic code for parsing the at least one difference file to determine whether to add, modify, or delete a file in the original set of files and logic code for updating the local file system and the database based on the parsing.

In another exemplary embodiment, the exemplary computer program product further comprises logic code for parsing the update response for a broadcast message, logic code for accessing and updating the database based on the broadcast message, logic code for sending a broadcast response to the gateway or the remote server. In one embodiment, the logic code for accessing and updating includes logic code for selectively marking at least one set of files as out-of-date.

In yet another exemplary embodiment, the logic code for performing a status check or update includes logic code for opening a communications session with a gateway or a remote server, logic code for sending a status check or update request to the gateway or the remote server, logic code for receiving a status check or update response from the gateway or the remote server, logic code for closing the communications session, and logic code for updating a local file system and a database if at least one difference file is included in the status check or update response.

In one embodiment, the logic code for updating a local file system and a database includes logic code for loading the at least one difference file into a random access memory, logic code for loading a copy of the original set of files into the random access memory, logic code for applying the at least one difference file on the original set of files in the random access memory to obtain an updated set of files, logic code for copying the updated set of files into the local file system, logic code for removing the original set of files from the local file system, logic code for updating the database based on the updated set of files, and logic code for removing the at least one difference file and the original set of files from the random access memory. In another embodiment, the logic code for applying the at least one difference file to the original set of files in the random access memory includes logic code for parsing the at least one difference file to determine whether to add, modify, or delete a file in the original set of files and logic code for updating the local file system and the database based on the parsing.

BRIEF DESCRIPTION OF THE DRAWINGS

FIG. 4 illustrates an exemplary application identification table in accordance with an embodiment of the invention.

FIG. 5 illustrates an exemplary data identification table in accordance with an embodiment of the invention.

FIG. 6 illustrates an exemplary compression methods table in accordance with an embodiment of the invention.

FIG. 7 illustrates an exemplary application download table in accordance with an embodiment of the invention.

FIG. 8 illustrates an exemplary data download table in accordance with an embodiment of the invention.

FIG. 9 illustrates an exemplary application storage table in accordance with an embodiment of the invention.

FIG. 10 illustrates an exemplary data storage table in accordance with an embodiment of the invention.

FIG. 11 illustrates an exemplary application execution table in accordance with an embodiment of the invention.

FIG. 12 illustrates an exemplary data access table in accordance with an embodiment of the invention.

FIG. 13 illustrates an exemplary application cache change table in accordance with an embodiment of the invention.

FIG. 14 illustrates an exemplary data cache change table in accordance with an embodiment of the invention.

FIG. 15 illustrates an exemplary configuration table in accordance with an embodiment of the invention.

DETAILED DESCRIPTION OF THE INVENTION

Figure 1:
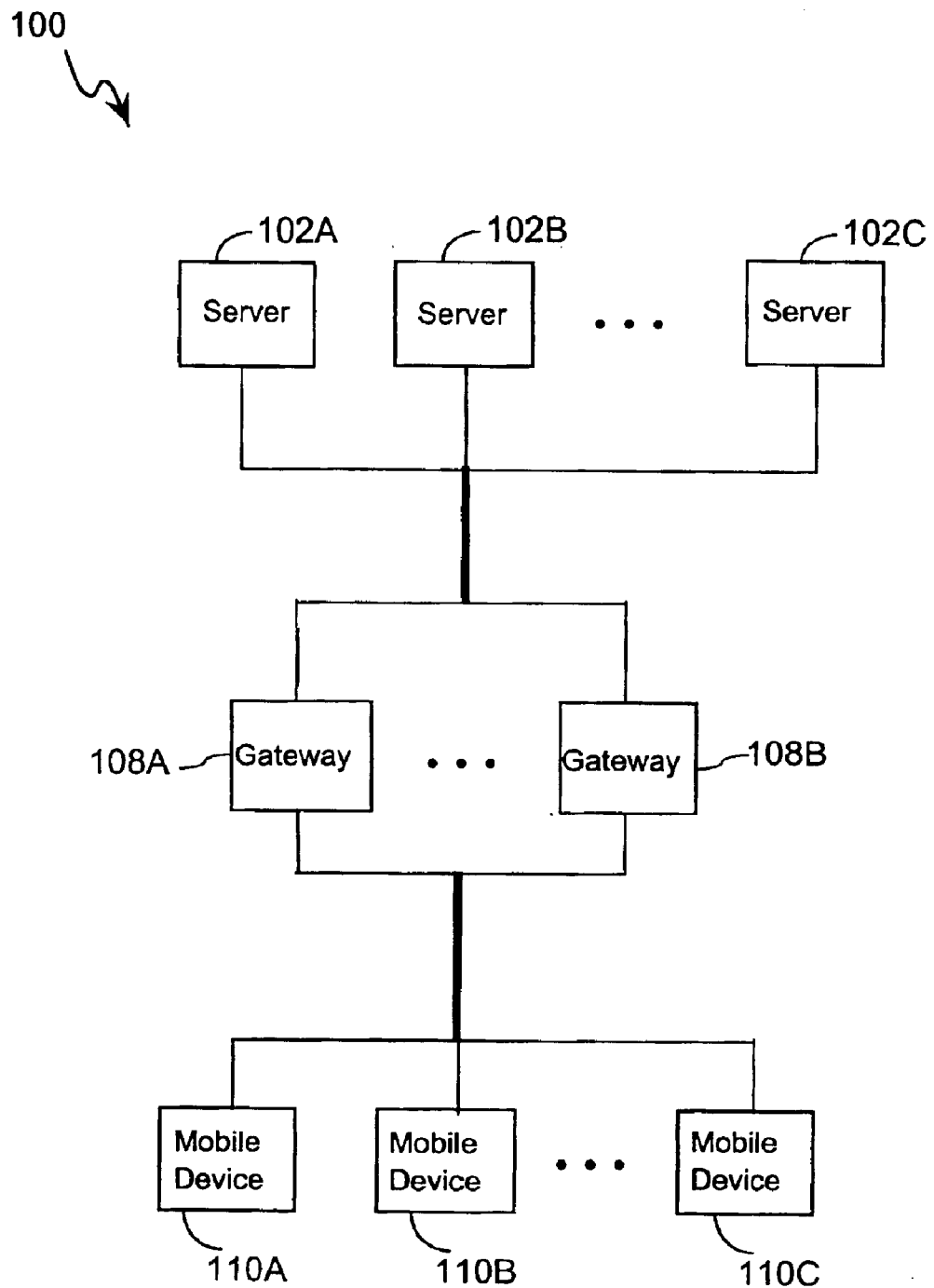
FIG. 1 schematically illustrates an exemplary prior art system.

FIG. 1 illustrates an exemplary prior art system 100. The system 100 includes multiple servers connected to multiple gateways that service multiple mobile devices. For ease of explanation, only a representative number of servers, gateways, and mobile devices are shown in FIG. 1. The system 100 includes servers 102A–102C, gateways 108A–108B, and mobile devices 110A–110C.

Figure 2:
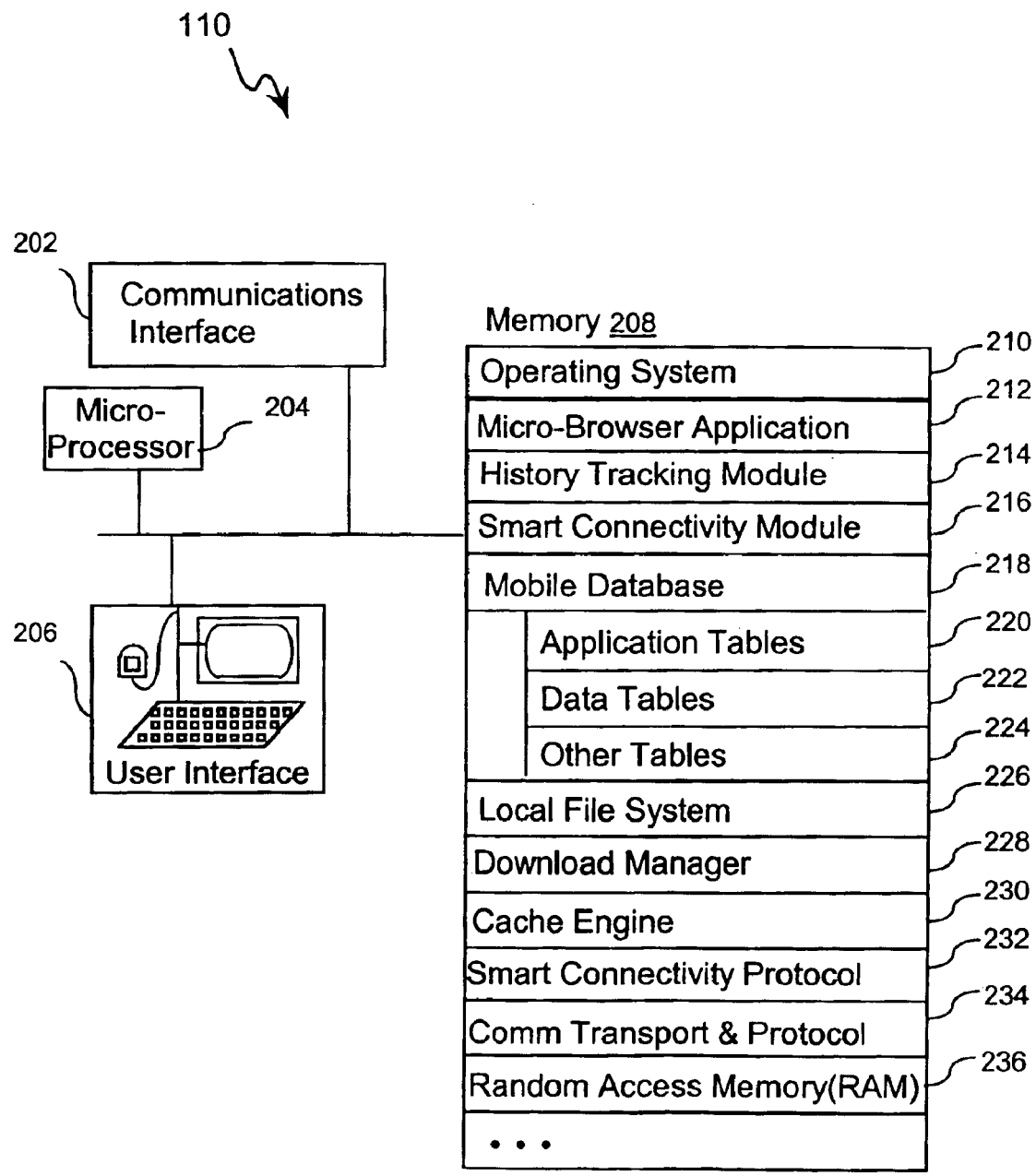
FIG. 2 schematically illustrates an exemplary mobile device in accordance with an embodiment of the invention.

FIG. 2 schematically illustrates an exemplary mobile device 110 in accordance with an embodiment of the invention. The mobile device 110 includes a communications interface 202 for communicating with a network, a microprocessor 204, a user interface 206, and a memory 208. In an exemplary embodiment, the user interface includes a user input device (e.g., keyboard) and an output device (e.g., screen). The memory 208 includes an operating system 210, a micro-browser application 212, a user operation history tracking module 214 for tracking user operation history, a smart connectivity module 216, a mobile database 218, a local file system 226 (e.g., built-in flash memory), a download manager 228, a cache engine 230, a smart connectivity protocol 232, a communications transport protocol module 234 for adapting to different transport protocols in the network, and a random access memory (RAM) 236. In an exemplary embodiment, the mobile database 218 includes a set of application tables 220, a set of data tables 222, and a set of other tables 224 for tracking user operation and cache storage information.

In an exemplary embodiment, the micro-browser application 212 provides a graphical user interface to a user. In one embodiment, a list of applications may be presented via the micro-browser application 212 to the user for receiving user selection. Each item in the list of applications includes a uniform resource locator (URL) and a brief description of the application. For example, the brief description includes a function description, product promotion, or URLs to other related web pages. In an exemplary embodiment, the user can select an application by browsing the list and highlighting the application or by entering an application number. When an application is selected, it is either loaded from the local file system 226, from the gateway 108, or from a remote server 102. The application selection information is tracked by the user operation history tracking module 214 and recorded in the application tables 220 and data tables 222 in the mobile database 218.

The smart connectivity module 216 determines whether an application or data requested for execution or access is already stored in the local file system 226 and sends a request to the gateway 108 or a remote server 102 via the download manager 228 to download the requested application or data if it is not stored in the local file system 226. The smart connectivity module 216 calls the cache engine 230 to intelligently determine (based on a calculated cache benefit index) whether a downloaded application/data should be cached, and if so, whether there is enough space to do so. Detailed description regarding the cache benefit index (CBI) and methods to intelligently cache applications and data on a mobile device is provided in a pending application entitled "Apparatus and Methods for Intelligently Caching Applications and Data on a Mobile Device," bearing application Ser. No. 09/840,736, filed on Apr. 23, 2001. This pending application is hereby incorporated for all purposes. Additionally, the smart connectivity module 216 maintains met information (i.e., synchronization version and app/data identification) for all cached application/data in the mobile database 218 in one or more of the tables 220–224.

When an application/data is downloaded, all files belonging to that application/data, including the executable files, configuration files, property files, online help files, etc., are downloaded as a bundle. Similarly, when an application/data is cached, all files belonging to that application/data are cached in the local file system 226.

In an exemplary embodiment, if the gateway 108 and the server 102 are compatible (3$i$) gateway and (3$i$) server, respectively, communications between the mobile device 110 and the gateway 108 or the server 102 are based on the smart connectivity protocol 232 that is stacked on top of the communication transport and protocol 234 (e.g., wireless application protocol (WAP), TCP/IP, HTTP, infra-red data association (IrDA), or Bluetooth). If the gateway 108 and the server 102 are not compatible (non-3$i$), then communications between the mobile device 110 and such gateway and server are based only on the communication transport and protocol 234. Additional description relating to the 3$i$ gateway and the 3$i$ server is disclosed in co-pending applications entitled "Apparatus and Methods for Intelligently Caching Applications and Data on a Gateway," bearing Ser. No. 09/841,777, filed on Apr. 24, 2001 and "Apparatus and Methods for Managing Caches on a Gateway," bearing Ser. No. 09/840,739, filed on Apr. 23, 2001. These applications are hereby incorporated by reference for all purposes.

Figure 3:
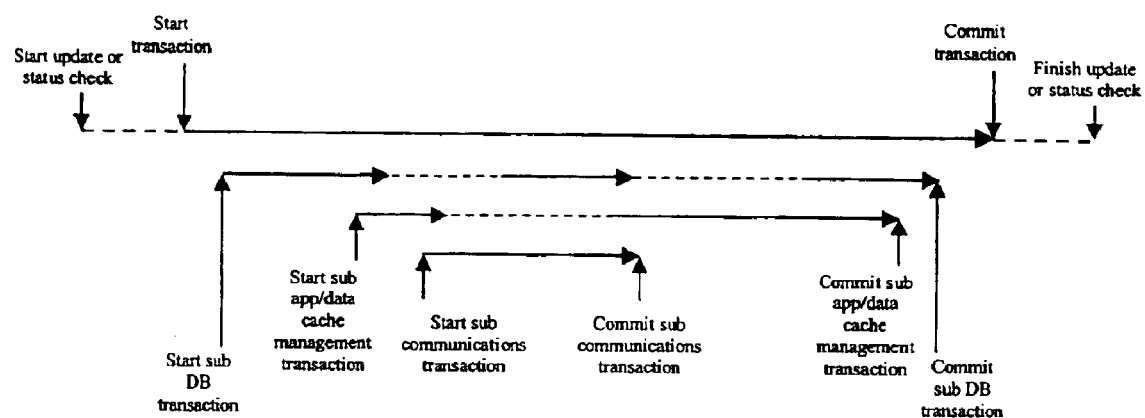
FIG. 3 schematically illustrates an exemplary two level transaction support process in accordance with an embodiment of the invention.

FIG. 3 illustrates an exemplary transaction and sub-transaction management in accordance with an embodiment of the invention. During each application/data downloading or application/data updating, the smart connectivity module 216 maintains the consistency and integrity among database operations and application/data cache space management. A transaction corresponding to an application/data update or status check is created after the smart connectivity module 216 initiates the update or status check request on the mobile device 110. The transaction is committed when the smart connectivity module 216 succeeds in the update or status check processes; otherwise, if the smart connectivity module 216 fails in the processes, the transaction is rolled back to its original state. In an exemplary embodiment, during a transaction processing, the smart connectivity module 216 may also create several sub-transactions within the transaction for various database operations. For example, the sub-transactions include an application or data cache space management transaction and communication transactions with the gateway 108 or a remote server 102. Sub-transactions become fully committed when the initial transaction becomes committed.

In an exemplary embodiment, the mobile database 218 includes a number of tables 220–224. Each table is designed to maintain a type of logical information. The smart connectivity module 216 updates the mobile database 218 and the local file system 226 in accordance with each operation performed. For example, if a requested application or data is already preloaded or cached, the smart connectivity module 216 updates the corresponding application execution table (see FIG. 11 below) or data access table (see FIG. 12 below). If a requested application or data is not already cached, the smart connectivity module 216 calls the download manager 228 to download the application or data. Next, the smart connectivity module 216 updates the application download table (see FIG. 7 below) or the data download table (see FIG. 8 below). The smart connectivity module 216 then calls the cache engine 230 to determine whether to cache the downloaded application. If so, the application or data is cached, and the smart connectivity module 216 updates the application storage table (see FIG. 9 below) or the data storage table (see FIG. 10 below) and the application cache change table (see FIG. 13 below) or the data cache change table (see FIG. 14 below).

The mobile database 218 is managed in the mobile device 110 by either a third-party (commercially available) database management system or a built-in micro database management system in the mobile operation system 210. In an exemplary embodiment, twelve tables are maintained in the mobile database 218. Exemplary tables are illustrated in FIGS. 4–15 below.

FIG. 4 illustrates an exemplary application identification table. The purpose of this table is to associate each application uniform resource locator (URL) to a unique identifier.

FIG. 5 illustrates an exemplary data identification table. The purpose of this table is to associate each data URL to a unique identifier.

FIG. 6 illustrates an exemplary compression methods table. The purpose of this table is to associate each data compression method name to a unique identifier.

FIG. 7 illustrates an exemplary application download table. The purpose of this table is to track the download histories of all applications downloaded by the mobile device 110.

FIG. 8 illustrates an exemplary data download table. The purpose of this table is to track the download histories of all data downloaded by the mobile device 110.

FIG. 9 illustrates an exemplary application storage table. The purpose of this table is to maintain the meta information associated with all cached applications in the mobile device 110.

FIG. 10 illustrates an exemplary data storage table. The purpose of this table is to maintain the meta information associated with all cached data in the mobile device 110.

FIG. 11 illustrates an exemplary application execution table. The purpose of this table is to track the execution histories of all downloaded applications at the mobile device 110.

FIG. 12 illustrates an exemplary data access table. The purpose of this table is to track the access histories of all downloaded data at the mobile device 10.

FIG. 13 illustrates an exemplary application cache change table. The purpose of this table is to maintain a list of application URLs that have been swapped in or out of the local file system 226 until the information is transferred to the gateway 108.

FIG. 14 illustrates an exemplary data cache change table. The purpose of this table is to maintain a list of data URLs that have been swapped in or out of the local file system 226 until the information is transferred to the gateway 108.

FIG. 15 illustrates an exemplary configuration table. The purpose of this table is to set and maintain a set of configuration parameters that control the behavior of the mobile device 110.

Figure 16:
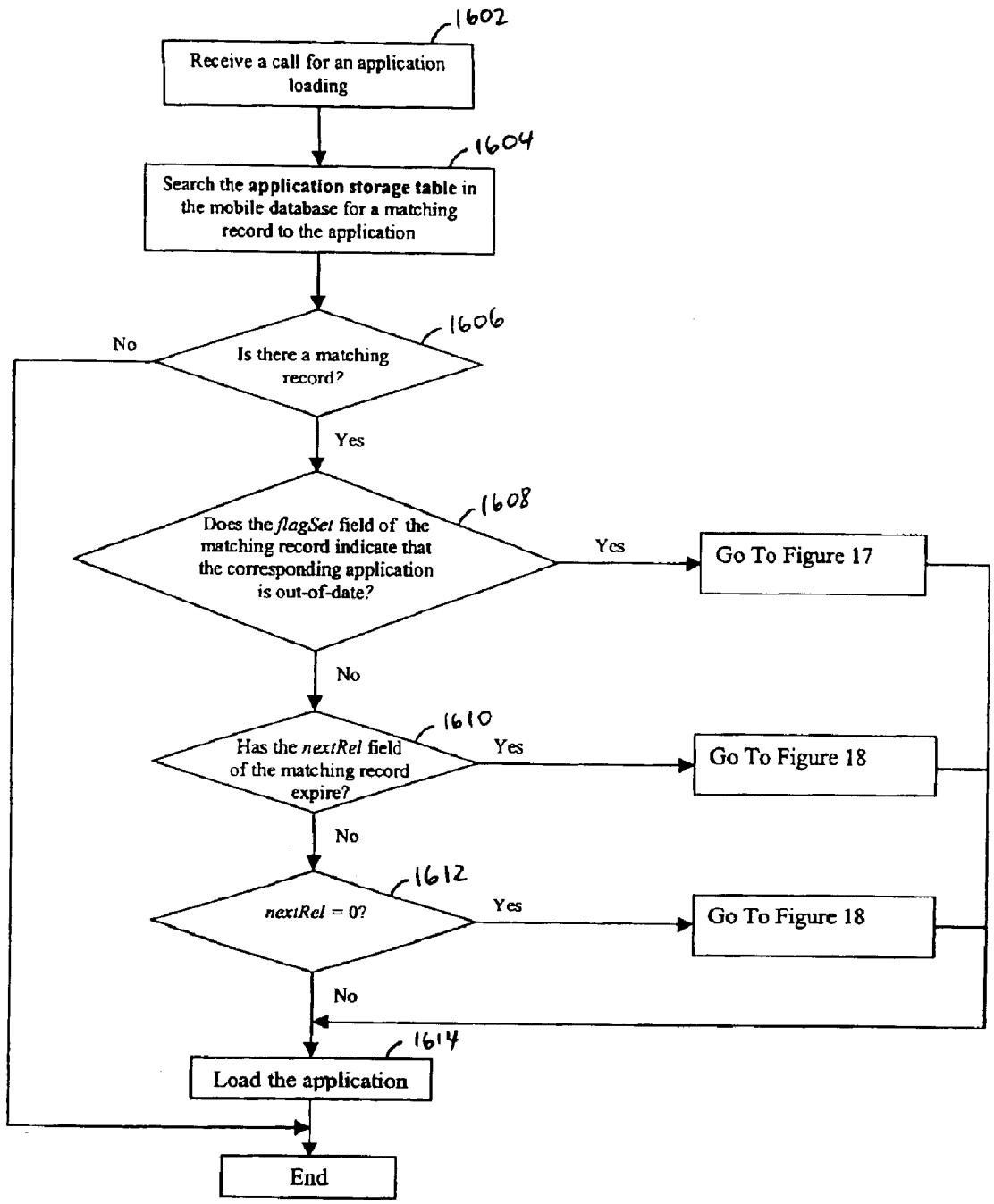
FIG. 16 illustrates an exemplary process in accordance with an embodiment of the invention.

FIG. 16 illustrates an exemplary application loading process in accordance with an embodiment of the invention. At step 1602, a call for an application loading is received. Next, the application storage table (see FIG. 9) is searched for a record that matches the called application (step 1604). If there is no matching record (step 1606), the process ends (i.e., the application will be downloaded from the gateway 108 or the server 102). If there is a matching record (step 1606), whether the "flagset" field of the matching record indicates that the corresponding application is out-of-date is determined (step 1608). If the flagset field indicates that the application is out-of date, the process continues in FIG. 17. Otherwise, whether the "nextRel" field in the matching record has expired is determined (step 1610). In an exemplary embodiment, the nextRel field has expired if it indicates a point in time older than the current time. If the nextRel has expired, the process continues in FIG. 18. Otherwise, whether the nextRel field is equal to zero is determined (step 1612). If the nextRel field is equal to zero, the process continues in FIG. 18. Otherwise, the application is up-to-date and is loaded from the local file system (step 1614).

Figure 17:
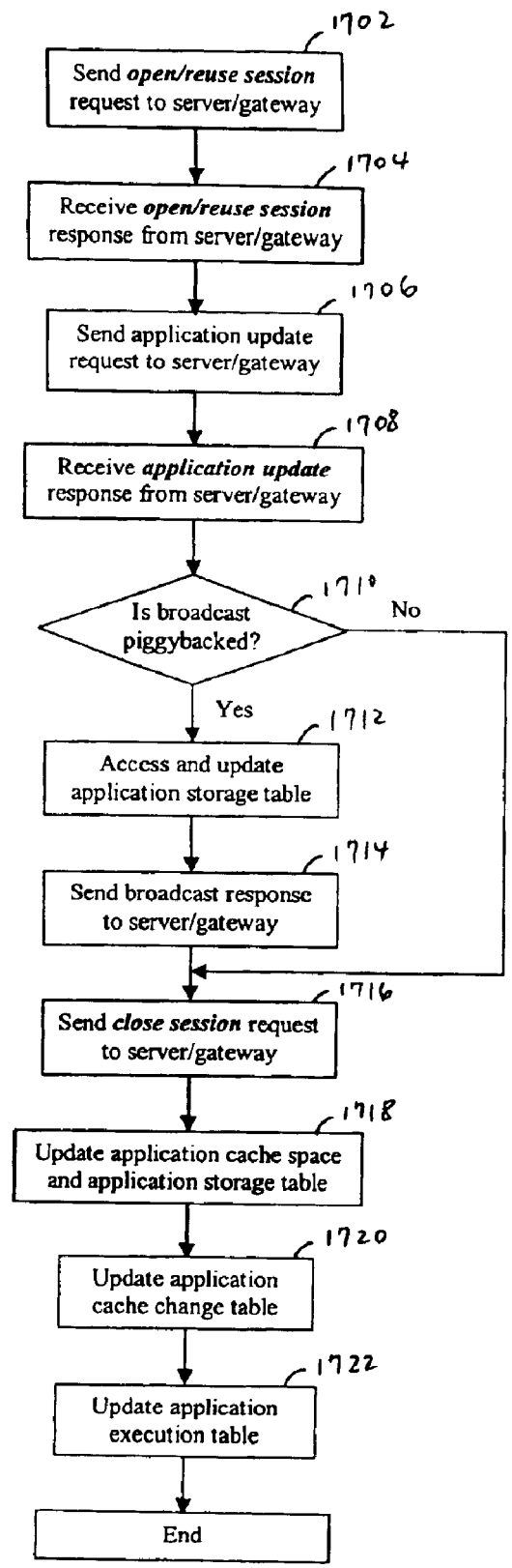
FIG. 17 illustrates another exemplary process in accordance with an embodiment of the invention.

FIG. 17 illustrates an exemplary update process in accordance with an embodiment of the invention. At step 1702, a request to open or reuse a communications session is sent to the gateway 108 or the server 102. Next, a response is received from the gateway 108 or the server 102 (step 1704). An application update request is sent to the gateway 108 or the server 102 (step 1706). In an exemplary embodiment, the application update request includes the following information: the application URL, the number of files in the application, and the name and version of each file in the application. A response to the update request is received from the gateway 108 or the remote server 102 (step 1708). In an exemplary embodiment, the response includes at least one difference file for updating the application differentially. The response is parsed to determine whether a broadcast is piggybacked (step 1710). If so, the application storage table (see FIG. 9) is accessed and updated (step 1712). In an exemplary embodiment, a broadcast message includes an application URL and an application version for each of one or more applications. The application storage table is searched for the appVer and flagset fields of each record that is associated with an application URL component in the broadcast message. The appVer field of a matching record and an application version component in the broadcast message are compared. If the versions are different, then set a corresponding flagset field to indicate that the associated application is out-of-date. This process repeats for all applications in the broadcast message. Next, a broadcast response is sent back to the gateway 108 or the remote server 102 (step 1714) and the process continues at step 1716. Referring back to step 1710, if no broadcast information is piggybacked, the process continues at step 1716.

At step 1716, a close session request is sent to the gateway 108 or the server 102 and the communication is disconnected. The local file system 226 and the application storage table (see FIG. 9) are updated (step 1718). In an exemplary embodiment, the local files system 226 is updated by applying the received at least one difference file to the corresponding application cached in the local file system 226 to obtain an updated application. In an exemplary embodiment, the following fields in the application storage table are updated: number of files, file names, versions, next application release schedule, language, flagset, nUpdate, updateRate, and CBI. In one embodiment, the new nUpdate=old nUpdate+1, the new updatRate=[(old updateRate×old nUpdate)+(diffSize×100/appSize)]/new nUpdate, and the new CBI=old CBI−diffSize, where diffSize is the size difference between the new and old application versions. In an exemplary embodiment, some or all originally cached applications may have to be removed from the local file system 226 to create space for storing the updated application. In such a case, records corresponding to the removed applications are also removed from the application storage table (see FIG. 9) and the application cache change table (see FIG. 13) is updated to reflect the removal (step 1720). Next, the application execution table (see FIG. 11) is updated (step 1722). An updated record contains the time stamp, version information, and per-execution CBI related to the current execution of the updated application.

In an exemplary embodiment, application/data update is performed when the mobile device 110 is not in use by the user (e.g., user is making a call or executing any application). In addition, an on-going updating process is interrupted and terminated when an incoming call is received or if the user wishes to terminate the updating process. In one embodiment, an interrupted updating process can be resumed later at the point/state of interruption. In another embodiment, the updating process is executed in a transactional manner. That is, an updating process is either finished completely or the application/data being updated returns to its original state when an attempted update is interrupted.

Figure 18:
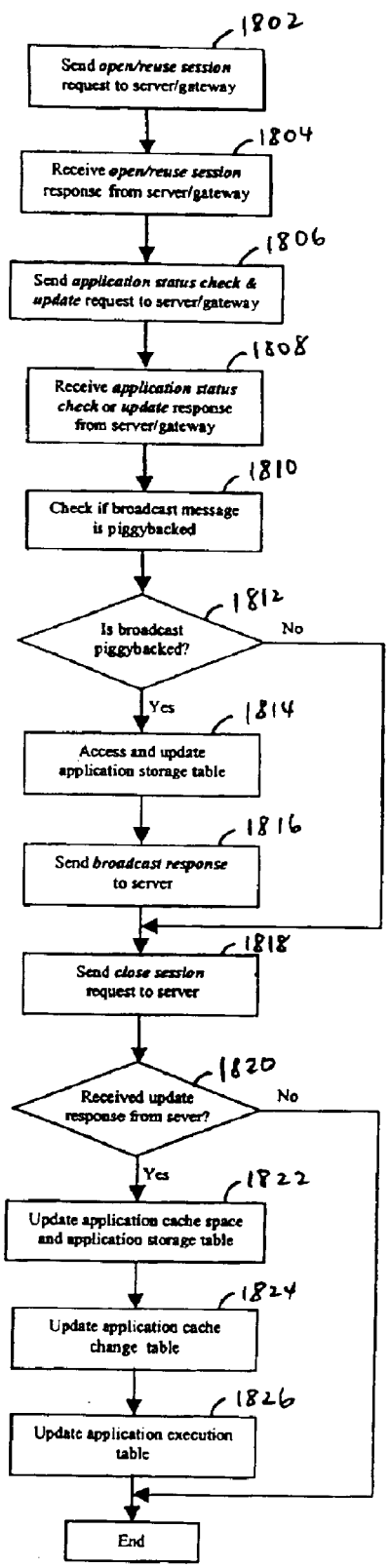
FIG. 18 illustrates another exemplary process in accordance with an embodiment of the invention.

FIG. 18 illustrates an exemplary application status check or update process in accordance with an embodiment of the invention. At step 1802, a request to open or reuse a communications session is sent to the gateway 108 or the server 102. Next, a response is received from the gateway 108 or the server 102 (step 1804). An application status check or update request is sent to the gateway 108 or the server 102 (step 1806). In an exemplary embodiment, the application status check or update request includes the following information: the application URL, the application version, the number of files in the application, and the name and version of each file in the application. A response to the application status check or update request is received from the gateway 108 or the server 102 (step 1808). In an exemplary embodiment, the response includes a current version status of the application or at least one difference file for updating the application. The response is parsed to determine whether a broadcast message is piggybacked (step 1810). If a broadcast message is piggybacked (step 1812), the application storage table (see FIG. 9) is accessed and updated (step 1814). In an exemplary embodiment, a broadcast message includes an application URL and an application version for each of one or more applications. The application storage table is searched for the appVer and flagset fields of each record that is associated with an application URL component in the broadcast message. The appVer field of a matching record and an application version component in the broadcast message are compared. If the versions are different, then set a corresponding flagset field to indicate that the associated application is out-of-date. This process repeats for all applications in the broadcast message. Next, a broadcast response is sent back to the gateway 108 or the remote server 102 (step 1816) and the process continues at step 1818. Referring back to step 1812, if no broadcast information is piggybacked, the process continues at step 1818.

At step 1818, a close session request is sent to the gateway 108 or the server 102 and the communication is disconnected. Next, whether an update response is received from the gateway 108 or the server 102 is determined (step 1820). If not, the process ends. If an update response is received, the local file system 226 and the application storage table (see FIG. 9) are updated (step 1822) In an exemplary embodiment, the local file system 226 is updated by applying the received at least one difference file to the corresponding application cached in the local file system to obtain an updated application. In an exemplary embodiment, the following fields in the application storage table are updated: number of files, file names, versions, next application release schedule, language, flagset, nUpdate, updateRate, and CBI. In one embodiment, the nUpdate, updatRate, and CBI are updated as described above in FIG. 17. In an exemplary embodiment, some or all originally cached applications may have to be removed from the local file system 226 to create space for storing the updated application. In such a case, records corresponding to the removed applications are removed from the application storage table (see FIG. 9) and the application cache change table (see FIG. 13) is updated to reflect the removal (step 1824). Next, the application execution table (see FIG. 11) is updated (step 1826). An updated record contains the time stamp, version info, and pre-execution CBI related to the current execution of the updated application.

An application or data typically comprises a set of files. When an application or data is updated, one or more of a corresponding set of files is updated (i.e., added, modified, or removed). In an exemplary embodiment, at least one difference file is created by the gateway 108 or the server 102 that represents the difference between the old version and the new version of the application to be updated. A difference file provides information regarding a file to be added to an original set of files, a file in an original set of files that should be modified, or a file in an original set of files that should be deleted. For example, to add a file, a difference file includes the file's name, a 16-byte version information, contents of the new file, and the size of the new file in bytes. To delete a file, a difference file includes the name of the file to be deleted. To modify a file, a difference file includes a description of the difference between the modified file and the original file or the contents of the modified file, whichever is smaller.

Figure 19:
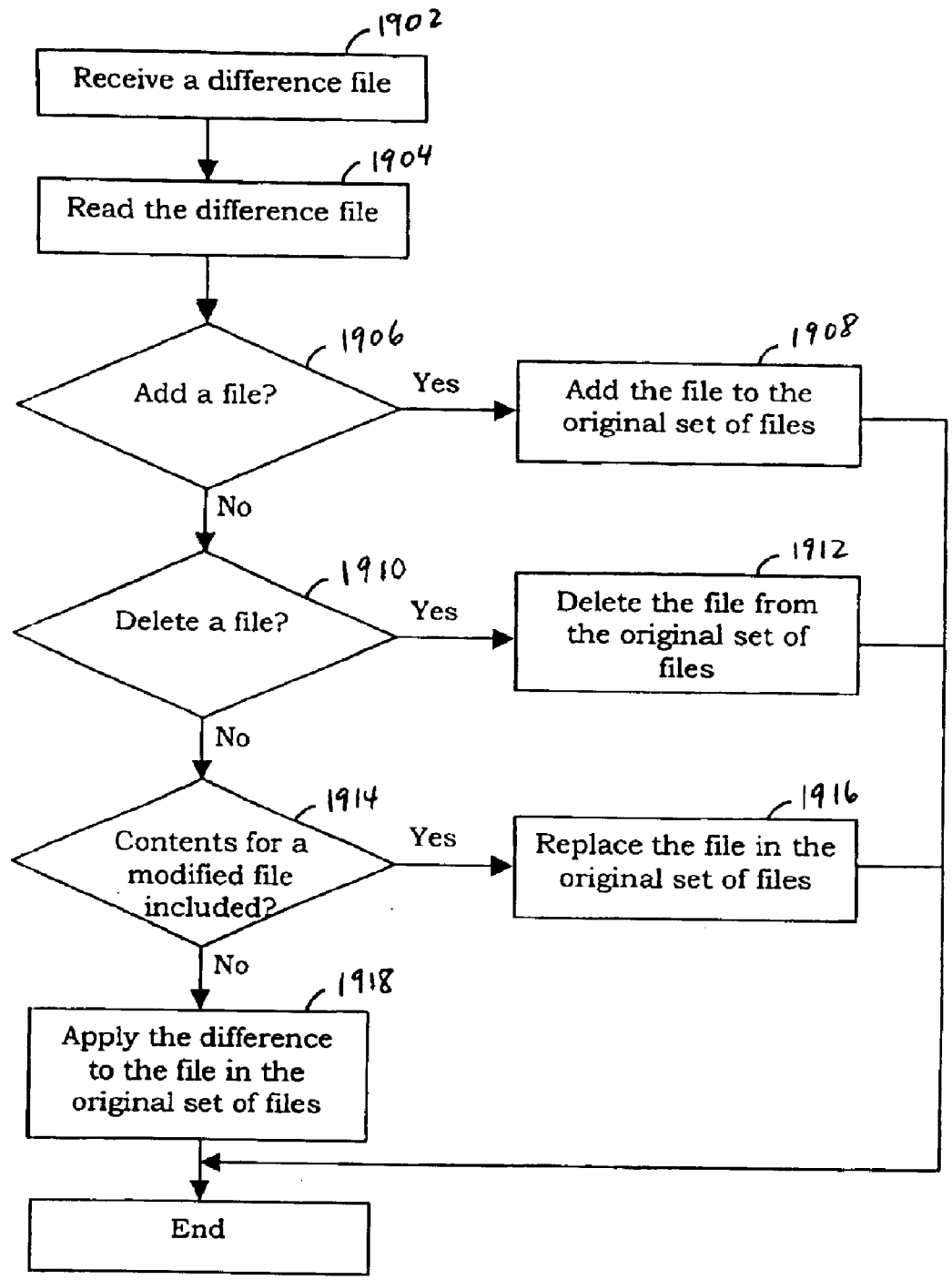
FIG. 19 illustrates another exemplary process in accordance with an embodiment of the invention.

FIG. 19 illustrates an exemplary process to differentially update a file in an application in accordance with an embodiment of the invention. At step 1902, a difference file is received. The received difference file is parsed (step 1904). Next, whether a file is to be added to an original set of files is determined (step 1906). If so, the file is added to the original set of files (step 1908). If no file is to be added, whether a file is to be deleted is determined (step 1910). If so, the appropriate file is deleted from the original set of files (step 1912). If no file is to be deleted, by default, at least a file in the original set of files should be modified. Thus, whether the contents of the file to be modified is included in the difference file is determined (step 1914). If the contents of the file to be modified is included, that file in the original set of files is replaced with a modified file in the difference file (step 1916). Otherwise, that file in the original set of files is modified in accordance with instructions in the difference file (step 1918).

Figure 20:
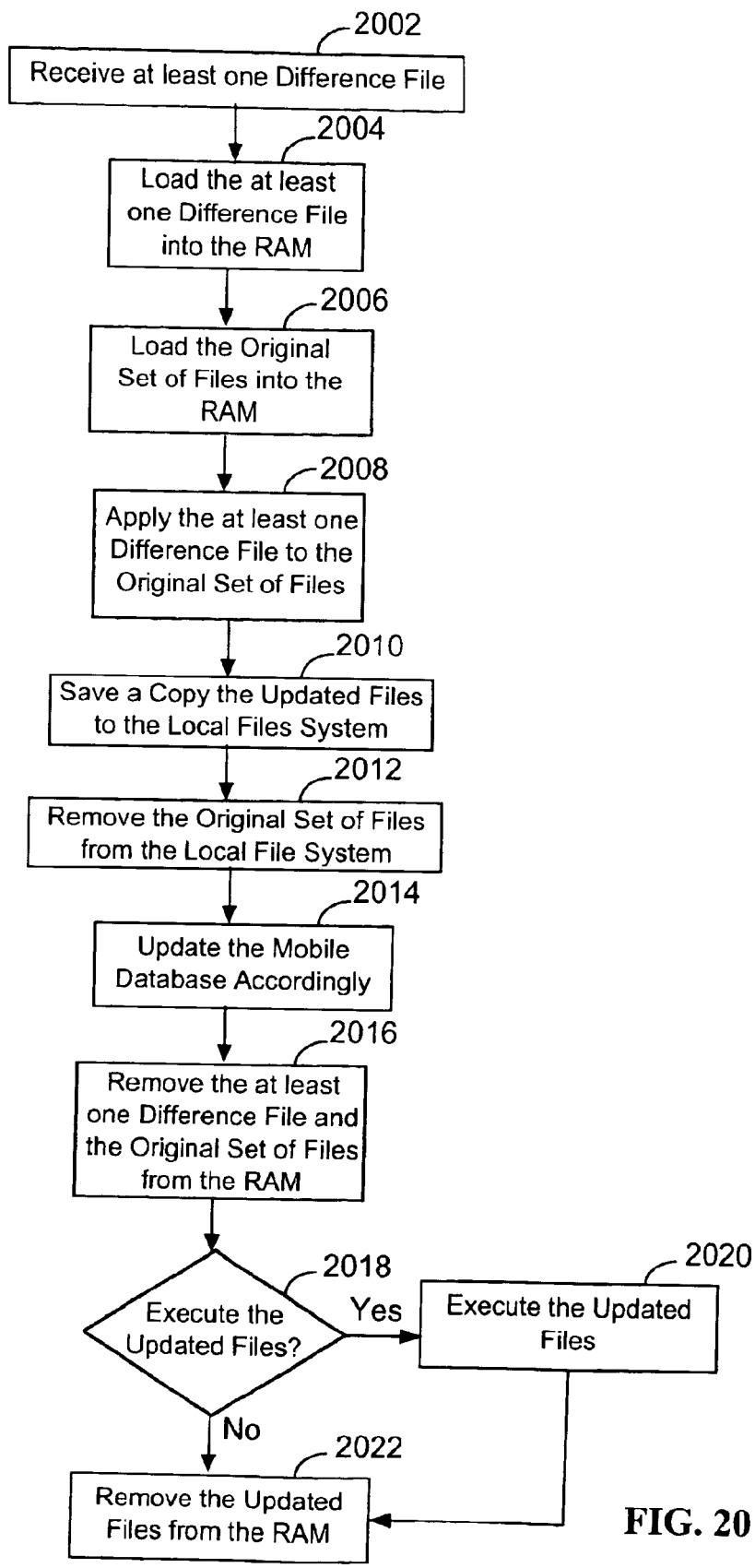
FIG. 20 illustrates another exemplary process in accordance with an embodiment of the invention.

FIG. 20 illustrates an exemplary application update process that reduces the probability of application corruption in accordance with an embodiment of the invention. At step 2002, at least one difference file is received from the gateway 108 or the server 102. The at least one difference file is placed into the RAM 236 of the mobile device 10 (step 2004). A copy of a set of files of an application to be updated is loaded from the local file system 226 into the RAM 236 (step 2006). The at least one difference file is applied to the set of files in the RAM 236 as described in FIG. 19 above to obtain an updated set of files (step 2008). Next, a copy of the updated set of files is saved in the local file system 226 (step 2010). In an exemplary embodiment, the original set of files is removed or overwritten in the process of copying the updated set of files (step 2012). Next, the current application update transaction is reflected in the mobile database 218 (step 2014). For example, appropriate fields in the application cache change table and the application storage table are updated. The at least one difference file and the original set of files are removed from the RAM 236 (step 2016). Next, depending on the application type and/or the operation system features, whether the updated application should be executed is determined (step 2018). If so, the updated application may remain in the RAM 236 until it is executed (step 2020). If the updated application is not to be executed or after an execution, the updated application is removed from the RAM 236 (step 2022).

In an exemplary embodiment, to further ensure data integrity, the smart connectivity module 216 scans the RAM 236 (or the application cache space) and the mobile database 218 after each power up of the mobile device 110 to identify any data inconsistency among them. And, if necessary, the smart connectivity module 216 repairs the mobile database 218 to correct any data inconsistency.

Although FIGS. 16–20 illustrate exemplary processes to process applications, these processes similarly apply to data.

Figure 21:
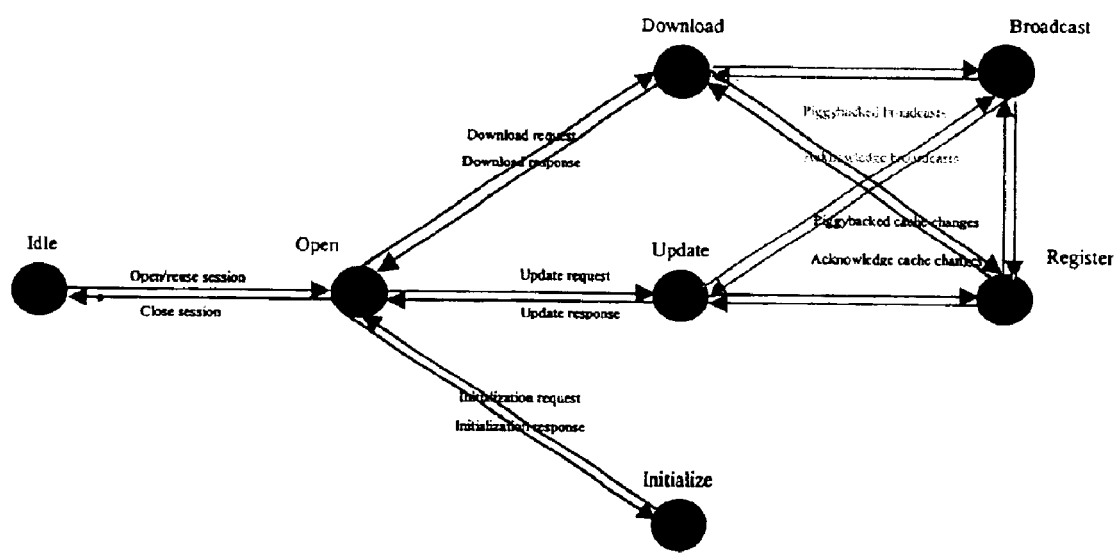
FIG. 21 schematically illustrates exemplary smart connectivity protocol state machines in accordance with an embodiment of the invention.

The smart connectivity protocol (SCP) is a protocol used for application/data management between the mobile device 110 and the gateway 108 or between the mobile device 110 and a remote server 102. FIG. 21 illustrates exemplary state machines of the SCP in accordance with an embodiment of the invention. Generally, when the SCP is in an Idle state, no communication session is created and, thus, no communication activity is taking place. When the SCP is in an Open state, a communication session is created; the system may be for communication requests from a client. When the SCP is in a Download state, a download request is sent or a download response is prepared. When the SCP is in an Update state, an update request is sent or an update response is prepared. When the SCP is in an Initialize state, an initialization request is sent or an initialization is prepared. When the SCP is in a Register state, cache changes are piggybacked or an acknowledgment is prepared. When the SCP is in a Broadcast state, broadcasts are piggybacked or an acknowledgment is prepared.

One advantage of the present invention is that applications and data cached on each mobile device 110 are customized in accordance with each particular user's operation history. That is, less frequently used applications and data cached on each mobile device 110 are continuously replaced by more frequently used applications and data. Thus, pre-loaded applications/data on a mobile device 110 can eventually be adapted to individual users.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. A method for managing a cache on a mobile device, comprising the steps of:
    receiving a call for loading a set of files at a mobile device, said set of files including an application or data;
    searching a local database at said mobile device for a matching record to said set of files;
    based on said matching record, determining if said set of files is out-of-date or if a scheduled update is overdue;
    updating said set of files if it is out-of-date;
    performing a status check or update if said scheduled update is overdue;
    loading said set of files if it is not out-of-date and said scheduled update is not overdue;
    downloading said set of files if it is out-of-date;
    calculating a cache benefit index for said set of files, said cache benefit index indicating a total benefit for caching said set of files; and
    determining whether to cache said set of files on said local database based on said cache benefit index.

2. The method of claim 1, further comprising the step of:
    loading an updated set of files after an update or status check is complete.

3. The method of claim 1, wherein said updating step includes the steps of:
    opening a communications session with a gateway or a remote server;
    sending an update request to said gateway or said remote server;
    receiving an update response, said response including at least one difference file for updating said set of files;
    closing said communications session; and
    updating a local file system and said database based on said update response.

4. The method of claim 3, wherein said step of updating a local file system and said database includes the step of:
    loading said at least one difference file into a random access memory;
    loading a copy of said set of files into said random access memory;
    applying said at least one difference file on said set of files in said random access memory to obtain an updated set of files;
    copying said updated set of files into said local file system;
    removing said set of files from said local file system;
    updating said database based on said updated set of files; and
    removing said at least one difference file and said set of files from said random access memory.

5. The method of claim 4, further comprising the steps of:
    executing said updated set of files; and
    removing said updated set of files from said random access memory.

6. The method of claim 4, wherein said step of applying said at least one difference file includes the steps of:
    parsing said at least one difference file to determine whether to add, modify, or delete a file in said set of files; and
    updating said local file system and said database based on said parsing.

7. The method of claim 3, further comprising the steps of:
    parsing said update response for a broadcast message;
    accessing and updating said database based on said broadcast message; and
    sending a broadcast response to said gateway or said remote server.

8. The method of claim 7, wherein said accessing and updating steps include the step of:
    selectively marking at least one set of files as out-of-date.

9. The method of claim 1, wherein said step of performing a status check or update includes the steps of:
    opening a communications session with a gateway or a remote server;
    sending a status check or update request to said gateway or said remote server;
    receiving a status check or update response from said gateway or said remote server;
    closing said communications session; and
    updating a local file system and a database if at least one difference file is included in said status check or update response.

10. The method of claim 9, wherein said step of updating a local file system and a database includes the steps of:
    loading said at least one difference file into a random access memory;
    loading a copy of said set of files into said random access memory;
    applying said at least one difference file on said set of files in said random access memory to obtain an updated set of files;
    copying said updated set of files into said local file system;
    removing said set of files from said local file system;
    updating said database based on said updated set of files; and
    removing said at least one difference file and said set of files from said random access memory.

11. The method of claim 10, wherein said step of applying said at least one difference file includes the steps of:
parsing said at least one difference file to determine whether to add, modify, or delete a file in said set of files; and
updating said local file system and said database based on said parsing.

12. The method of claim 9, further comprising the steps of:
parsing said status check or update response for a broadcast message;
selectively marking at least one set of files as out-of-date based on said broadcast message; and
sending a broadcast response to said gateway or said remote server.

13. A computer program product, embedded in a computer readable medium, for managing a cache on a mobile device, comprising:
logic code for receiving a call for loading a set of files at a mobile device, said set of files including an application or data;
logic code for searching a local database at said mobile device for a matching record to said set of files;
logic code for determining if said set of files is out-of-date or if a scheduled update is overdue based on said matching record;
logic code for updating said set of files if it is out-of-date;
logic code for performing a status check or update if said scheduled update is overdue;
logic code for loading said set of files if it is not out-of-date and said scheduled update is not overdue;
logic code for downloading said set of files if it is out-of-date;
logic code for calculating a cache benefit index for said set of files, said cache benefit index indicating a total benefit for caching said set of files; and
logic code for determining whether to cache said set of files on said local database based on said cache benefit index.

14. The computer program product of claim 13, further comprising:
logic code for loading an updated set of files after an update or status check is complete.

15. The computer program product of claim 13, wherein said logic code for updating includes:
logic code for opening a communications session with a gateway or a remote server;
logic code for sending an update request to said gateway or said remote server;
logic code for receiving an update response, said response including at least one difference file for updating said set of files;
logic code for closing said communications session; and
logic code for updating a local file system and said database based on said update response.

16. The computer program product of claim 15, wherein said logic code for updating a local file system and said database includes:
logic code for loading said at least one difference file into a random access memory;
logic code for loading a copy of said set of files into said random access memory;
logic code for applying said at least one difference file on said set of files in said random access memory to obtain an updated set of files;
logic code for copying said updated set of files into said local file system;
logic code for removing said set of files from said local file system;
logic code for updating said database based on said updated set of files; and
logic code for removing said at least one difference file and said set of files from said random access memory.

17. The computer program product of claim 16, further comprising:
logic code for executing said updated set of files; and
logic code for removing said updated set of files from said random access memory.

18. The computer program product of claim 16, wherein said logic code for applying said at least one difference file includes:
logic code for parsing said at least one difference file to determine whether to add, modify, or delete a file in said set of files; and
logic code for updating said local file system and said database based on said parsing.

19. The computer program product of claim 15, further comprising:
logic code for parsing said update response for a broadcast message;
logic code for accessing and updating said database based on said broadcast message; and
logic code for sending a broadcast response to said gateway or said remote server.

20. The computer program product of claim 19, wherein said logic code for accessing and updating include:
logic code for selectively marking at least one set of files as out-of-date.

21. The computer program product of claim 13, wherein said logic code for performing a status check or update includes:
logic code for opening a communications session with a gateway or a remote server;
logic code for sending a status check or update request to said gateway or said remote server;
logic code for receiving a status check or update response from said gateway or said remote server;
logic code for closing said communications session; and
logic code for updating a local file system and a database if at least one difference file is included in said status check or update response.

22. The computer program product of claim 21, wherein said logic code for updating a local file system includes:
logic code for loading said at least one difference file into a random access memory;
logic code for loading a copy of said set of files into said random access memory;
logic code for applying said at least one difference file on said set of files in said random access memory to obtain an updated set of files;
logic code for copying said updated set of files into said local file system;
logic code for removing said set of files from said local file system;
logic code for updating said database based on said updated set of files; and logic code for removing said at least one difference file and said set of files from said random access memory.

23. The computer program product of claim 22, wherein said logic code for applying said at least one difference file includes:

logic code for parsing said at least one difference file to determine whether to add, modify, or delete a file in said set of files; and logic code for updating said local file system and said database based on said parsing.

24. The computer program product of claim 21, further comprising:

logic code for parsing said status check or update response for a broadcast message;

logic code for selectively marking at least one set of files as out-of-date based on said broadcast message; and logic code for sending a broadcast response to said gateway or said remote server.

* * * * *